United States Patent Office 2,795,557
Patented June 11, 1957

2,795,557
COLLOIDAL SULFUR PROCESS

Samuel C. Carney, Bartlesville, Okla., assignor to Phillips Petroleum Company, a corporation of Delaware No Drawing. Application September 9, 1949,
Serial No. 114,927

5 Claims. (Cl. 252—313)

This invention relates to a process for producing colloidal sulfur. In one aspect this invention relates to a process for producing colloidal sulfur by oxidation of hydrogen sulfide in the presence of an aqueous emulsion. In one embodiment this invention relates to a process for producing an aqueous soap emulsion containing dispersed colloidal sulfur particles.

An object of my invention is to provide a novel process for producing colloidal sulfur.

Another object of my invention is to provide a novel process for the oxidation of hydrogen sulfide in the presence of an aqueous emulsion to produce colloidal sulfur.

A further object of my invention is to provide a novel process for dispersing colloidal sulfur particles throughout an aqueous soap emulsion.

A further object of my invention is to provide a process for producing an aqueous soap emulsion containing dispersed colloidal sulfur particles for use in the production of synthetic rubber.

Aqueous emulsions are rather frequently used in recipes for the polymerization of unsaturated organic compounds to form rubber-like elastomers, and in the subsequent treatment, particularly in the vulcanization, of the rubber-like elastomers, free sulfur or compounds containing sulphur are commonly employed.

I have found that hydrogen sulfide can be oxidized in the presence of aqueous emulsions and that there results from the reaction an aqueous emulsion containing dispersed colloidal sulfur. This product is useful in the production of synthetic rubber, since the aqueous emulsion is a component of many rubber recipes and since the resulting polymer contains the sulfur required for the vulcanization of the polymer.

Generally, for my process the aqueous emulsion that is employed is one that may be used in recipes for the production of synthetic rubber latices. The emulsifying agents include fatty acid soaps, such as the alkali metal salts of stearic, oleic or palmitic acids, alkyl aromatic sulfonates, such as dibutyl naphthalene sulfonate and dodecyl benzene sulfonate, non-ionic detergents, such as fatty acid condensates of ethylene oxide, and alkali metal salts of rosin acids or abietic acid. The aqueous emulsion for my process contains from 0.3 to 3.0 parts by weight of emulsifying agent in each 100 parts of water, but concentrations outside this range can be used without departing from the scope of my invention.

Hydrogen sulfide from any suitable source and an oxygen-containing gas, such as air or relatively pure process oxygen, are passed into the aqueous emulsion described above at about the reaction temperature. If desired, either or both of the reactant gases may be suitably preheated prior to the reaction. The reactant gases may be admixed prior to introduction to the reaction, or the gases may be introduced separately. Also, either or both of the gases may be introduced to the reaction zone multipointwise in order to obtain a uniform dispersion of sulfur, resulting from the oxidation reaction, throughout the aqueous emulsion. One preferred method of operating involves the introduction of hydrogen sulfide near the bottom of the reaction zone, and the oxygen-containing gas is then introduced multipointwise along the line of flow of the hydrogen sulfide through the aqueous emulsion. In this manner the resulting sulfur particles are evenly distributed throughout the emulsion.

The temperature at which the oxidation reaction is effected may vary from 70 to 200° F., and a preferable temperature range is from 100 to 150° F. If the emulsion polymerization is carried out at a temperature within this range, it is usually desirable to carry out the hydrogen sulfide oxidation reaction at about the same temperature at which the emulsion polymerization is effected. In that event, it is unnecessary to heat or cool the aqueous emulsion containing dispersed sulfur particles prior to use in the emulsion polymerization. For example, some emulsion polymerization reactions using butadiene and styrene as the polymerizable compounds are carried out at about 120° F. In that event, it is desirable to oxidize the hydrogen sulfide at about the same temperature. Then, the aqueous emulsion containing dispersed sulfur particles can be used without further treatment in the emulsion polymerization process. On the other hand, some emulsion polymerization processes are presently being carried out at temperatures below the above-named temperature ranges, i. e., in the neighborhood of 41° F. for such processes, it will be necessary to cool the aqueous emulsion produced in accordance with my invention to about 41° F. or lower prior to use in a low temperature emulsion polymerization process.

The oxidation reaction is effected with a molar ratio of hydrogen sulfide to oxygen within the range of 1.8:1 to 2.2:1, preferably about 2:1. Molar ratios outside this expressed range may be used, but their use is uneconomical since a substantial portion of at least one of the reactants is caused to pass through the emulsion unreacted.

The amount of finely divided sulfur that is dispersed throughout the aqueous emulsion varies rather widely, and it is dependent upon the wishes of the operator, the degree and ease of vulcanization desired of the finished rubber product, and other similar factors. Accordingly, hydrogen sulfide is oxidized in the presence of the aqueous emulsion until an amount of sulfur within the range of 0.1 to 10, preferably 0.5 to 5.0, parts by weight of sulfur per 100 parts by weight of emulsion have been dispersed throughout the emulsion. Upon completion of the oxidation reaction a stream of an inert gas, such as nitrogen, is passed through the emulsion to sweep unconverted reactants from the emulsion. The oxidation reaction has an effect upon the pH of the aqueous emulsion, and usually an acidic pH is noted after sufficient sulfur has been dispersed throughout the aqueous emulsion. For some emulsion polymerization processes, emulsions having an acidic pH are employed, and in that event it is unnecessary to adjust the pH. If a less acidic pH, and particularly an alkaline pH, is desired, an amount of an aqueous solution of an alkali hydroxide, such as potassium hydroxide, sufficient to effect the desired pH adjustment is introduced to the aqueous emulsion.

Although a catalyst is not necessary for my oxidation reaction, suitable oxidation catalysts may be employed. In general, these catalysts are similar to the catalysts that are employed to effect the emulsion polymerization process in order that the aqueous emulsion containing dispersed sulfur particles and oxidation catalyst can be used directly in the polymerization recipe. These catalysts include the emulsion polymerization catalysts, such as peroxides, hydroperoxides, perborates and persulfates. More particularly, these catalysts include hydrogen peroxide, benzoyl peroxide, cumene hydroperoxide, tert-butyl hydroperoxide, sodium perborate and ammonium persulfate. The catalyst is employed in an amount such that, upon the completion of the oxidation reaction, the aqueous emulsion contains an amount of catalyst suitable for emulsion polymerization recipes. Thus, for my oxidation reaction any catalyst that is used is employed in a concentration within the range of 0.1 to 10, preferably not above 4, parts by weight per 100 parts of aqueous emulsion.

Upon completion of the oxidation reaction the aqueous emulsion obtained in accordance with my process as described above contains suitable components in proper concentrations for use in the emulsion polymerization of unsaturated organic compounds to form rubbery products. These unsaturated organic compounds generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, nitrile, carboxy and the like. Included in this class of monomers are the conjugated butadienes or 1,3-butadienes, such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methyl chloroprene (2-chloro-3-methyl-1,3-butadiene), and the like; aryl olefins, such as styrene, various alkyl styrenes, o-chloro styrene, p-methoxystyrene, alpha-methylstyrene, vinyl naphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methylisopropenyl ketone, methyl vinyl ketone, methyl vinyl ether, vinylethinyl alkyl carbinols, vinyl acetate, vinyl chloride, vinylidene chloride, vinyl furane, vinyl carbazole, vinyl acetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers. Of the above-named unsaturated organic compounds 1,3-butadiene and styrene are the most readily and commercially available monomers. My invention is adaptable to the emulsion polymerization of these two reactants in the usual relative ratios of butadiene to styrene between 65:35 to 90:10 by weight.

*Example*

Sodium stearate (2.5 parts by weight) is added to 100 parts of water to produce an aqueous emulsion. Benzoyl peroxide (4 parts by weight) is added to the emulsion, and the resulting mixture is stirred to provide adequate mixing. A gaseous mixture of hydrogen sulfide and oxygen in a molar ratio of 2:1 is passed through the resulting emulsion at a temperature of 125° F. until 3.5 parts by weight of sulfur are dispersed throughout the emulsion. During the reaction the emulsion is stirred to obtain uniform dispersion of the sulfur. A stream of nitrogen gas is passed through the emulsion to remove unconverted reactants, and potassium hydroxide is then added to the emulsion until the pH indicates that the emulsion is basic.

The emulsion prepared in the manner described is ready for use in an emulsion polymerization recipe containing butadiene and styrene.

From the foregoing disclosure modifications of my process will be apparent to those skilled in the art without departing from the purview of my invention.

I claim:

1. The process of preparing a polymerization medium comprising adding 0.3 to 3.0 parts by weight of sodium stearate to 100 parts of water to produce an aqueous emulsion, adding 0.1 to 10 parts by weight of benzoyl peroxide to said emulsion, passing a gaseous mixture of hydrogen sulfide and oxygen in a molar ratio of 1.8:1 to 2.2:1 through said emulsion at a temperature of 70° to 200° F. until 0.1 to 10 parts by weight of sulfur are dispersed throughout the emulsion, passing a stream of nitrogen gas through said emulsion to remove unconverted reactants, and adding sufficient alkali to give a basic pH.

2. The process of preparing an aqueous colloidal dispersion of sulfur suitable for use in emulsion polymerization processes which comprises passing hydrogen sulfide and a free oxygen containing gas into a reaction zone containing an aqueous emulsion comprising from 0.3 to 3.0 parts by weight of a fatty acid soap at a temperature of 70 to 200° F. for a time sufficient to give a sulfur content of 0.1 to 10 parts by weight of sulfur per 100 parts by weight of said emulsion, said process being carried out in the presence of a catalyst selected from the group consisting of peroxides, hydroperoxides, perborates and persulfates.

3. The process which comprises oxidizing hydrogen sulfide with a gas containing free oxygen in the presence of an aqueous emulsion and a catalyst selected from the group consisting of peroxides, hydroperoxides, perborates and persulfates to produce an aqueous emulsion containing colloidal sulfur particles.

4. A process according to claim 3 wherein the oxidation catalyst is employed in a concentration in the range of 0.1 to 10 parts by weight per 100 parts of emulsion.

5. A process according to claim 3 wherein the hydrogen sulfide is oxidized at a temperature in the range of 70 to 200° F.

References Cited in the file of this patent

UNITED STATES PATENTS

| | | |
|---|---|---|
| 1,911,498 | Goetze | May 30, 1933 |
| 1,917,351 | Young | July 11, 1933 |
| 1,995,545 | Leahy | Mar. 26, 1935 |
| 2,028,482 | Tucker | Jan. 21, 1936 |
| 2,043,084 | Ward et al. | June 2, 1936 |
| 2,416,440 | Fryling | Feb. 25, 1947 |

FOREIGN PATENTS

| | | |
|---|---|---|
| 532,351 | Great Britain | Jan. 22, 1941 |